United States Patent
Kim

(10) Patent No.: US 6,912,213 B2
(45) Date of Patent: Jun. 28, 2005

(54) REVERSE POWER CONTROL METHOD OF DATA TRANSMISSION FOR WIRELESS LOCAL LOOP

(75) Inventor: Eun Hye Kim, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 844 days.

(21) Appl. No.: 09/797,958

(22) Filed: Mar. 5, 2001

(65) Prior Publication Data

US 2001/0019549 A1 Sep. 6, 2001

(30) Foreign Application Priority Data

Mar. 6, 2000 (KR) ........................................ 2000-10970

(51) Int. Cl.$^7$ ............................................... H04Q 7/20
(52) U.S. Cl. ................................................... 370/338
(58) Field of Search ................................ 370/338, 318, 370/328; 455/13.4, 69

(56) References Cited

U.S. PATENT DOCUMENTS

| | | | | |
|---|---|---|---|---|
| 5,333,175 A | * | 7/1994 | Ariyavisitakul et al. | 370/311 |
| 5,564,074 A | * | 10/1996 | Juntti | 455/67.11 |
| 6,219,528 B1 | * | 4/2001 | Wright et al. | 370/321 |
| 6,334,047 B1 | * | 12/2001 | Andersson et al. | 455/69 |
| 6,347,231 B1 | * | 2/2002 | Miya | 455/522 |
| 6,405,021 B1 | * | 6/2002 | Hamabe | 370/342 |
| 6,571,104 B1 | * | 5/2003 | Nanda et al. | 370/332 |
| 6,744,754 B1 | * | 6/2004 | Lee | 370/332 |
| 2001/0029189 A1 | * | 10/2001 | Mandyman | 455/522 |
| 2002/0016177 A1 | * | 2/2002 | Miya et al. | 455/522 |

* cited by examiner

Primary Examiner—Chi Pham
Assistant Examiner—Anh-Vu H. Ly
(74) Attorney, Agent, or Firm—Fleshner & Kim, LLP

(57) ABSTRACT

A reverse power control method for a WLL is disclosed, in which the number of times of power control value transmission is reduced to 1. The disclosed method complements the related method, in which the power control of a radio interface unit is performed in units of 0.5 dB, so that power is controlled more concretely and flexibly. Unnecessary power consumption due to power control in the WLL system is thus reduced, and the load of the system is reduced, improving the reliability of the communication system.

26 Claims, 6 Drawing Sheets

REVERSE POWER CONTROL METHOD OF DATA TRANSMISSION FOR WIRELESS LOCAL LOOP

BACKGROUND OF THE INVENTION

1. Field of the Invention

The present invention relates to a power control method for a wireless local loop (hereinafter, "WLL"), and more particularly, to a reverse power control method of packet data transmission for a WLL.

2. Background of the Related Art

A WLL system is a system which replaces a predetermined portion of a wire communication line between a conventional switching network or public switching telephone network (PSTN) and a general subscriber network by a wireless line. Wire communication techniques adapted to the WLL include using an artificial satellite, using microwaves, using cellular techniques, using the cordless method, and using the WCDMA method.

FIG. 1 is a block diagram of a related art WLL system configuration. The WLL system as illustrated in FIG. 1 includes a plurality of subscriber terminals 10 used for communication by each subscriber and a plurality of radio interface units 20 (hereinafter, "RIU") coupled with the plurality of subscriber terminals 10 by a wire interface. Each of the plurality of RIUs 20 is also connected with a radio port 30 (hereinafter "RP") by a wireless interface, which provides a relay between both sides. The plurality of RPs 30 are wirelessly coupled with the plurality of RIUs for connecting or disconnecting a bearer. Next, radio port controllers 40 (hereinafter "RPC") are wirelessly connected with the plurality of RPs 30 for linking the subscriber of the WLL with a subscriber of another communication network by a call link. Finally, a network management system 50 (hereinafter, "NMS") is coupled to the RPC 40 for operating, controlling, maintaining, and repairing the entire WLL system.

FIG. 2 is a block diagram showing additional detail of the RP 30 and the RIU 20. Referring to FIG. 2, the RIU 20 includes an amplifier 22 for amplifying a source data applied from the subscriber terminal 10 to output the same and a first transmitter 24 for modulating a signal outputted from the amplifier 22 into a high frequency to wirelessly transmit the same. It further includes a first receiver 26 for receiving a high frequency signal wirelessly transmitted from the RP 30 and a first demodulator 28 for demodulating the high frequency signal from the first receiver 26 to extract a data.

The RP 30 includes a second receiver 32 for receiving the high frequency signal sent from the RIU 20 and a second demodulator 34 for demodulating the high frequency signal from the second receiver 34 to extract a data. Next, it includes a comparator 35 for comparing a received power value Eb transmitted from the second demodulator 34 with a prescribed reference power value No and calculating a ratio from them. The RP 30 further includes a SELECTOR 36 for mixing a signal controlling the power of the RIU 20 with a transmission data and a second transmitter 38 for modulating a signal outputted from the SELECTOR 36 into a high frequency signal.

In the WLL, the RIUs 20 in the same service area must transmit data at the same power level.

For example, if one of the plurality of RIUs 20 connected with the RP 30 has a relatively high power, this causes an interruption of the other RIUs 20, thereby increasing the framed error rate (FER) of a data. In addition, a call quality is reduced, and accordingly the other RIUs 20 must increase their power competitively in order to maintain their call quality. As a result, the efficiency of the WLL system is reduced. The corresponding RP 30 cannot recognize signal transmission of the corresponding RIU 20 if the power of the RIU 20 is relatively low.

Due to this problem, a method for appropriately controlling the power of the RIU 20 is needed.

FIG. 3 is a view of a related art power control status of a WLL. As illustrated in FIG. 3, the related art RP 30 measures the power of the RIU 20 in 1.25 ms duration, and the NMS 50 monitors and controls the operation of the above reverse power control.

FIG. 4 illustrates a sequential view of the related art reverse power control operation of the WLL.

The operational process of the reverse power control of the WLL in the conventional art includes a first step S10, in which the RP 30 initializes a timer T in order to measure the power outputted from the RIU 20 at a predetermined time interval, for instance, in 1.25 ms duration. Next, in step S20, the timer initialized in step S10 counts up and in step 30, it is determined whether power measuring time (1.25 ms) has passed by the timer in step S20. In step S40, feedback is sent to the count up of step S20 if the power, measuring time (1.25 ms) has not passed by the timer in step S20. Alternatively, if it is determined in step 30 that the measuring time (1.25 ms) has passed, the process proceeds to step S40, where it calculates the following equation 1:

$$Pm = Eb/No \qquad \text{[Equation 1]}$$

Here, Pm is the calculating value, Eb is the received output value, and No is the reference output value.

Next, in step S50, the RP 30 compares a calculated value of Pm with a preset reference value Pr. Then, in a step S60, the power of the RIU 20 is controlled to be down-adjusted by 0.5 dB if the calculating value Pm is larger than the reference value Pr. Alternatively, in step S70, the power of the RIU 20 is controlled to be up-adjusted by 0.5 dB if Pm is not greater than Pr.

As described above, in the related art reverse power control method for a WLL has various problems. For example, since the RP 30 transmits a power control signal continuously to the RIU 20 at predetermined time intervals, much power is consumed and the load of the network system is increased.

The above references are incorporated by reference herein where appropriate for appropriate teachings of additional or alternative details, features and/or technical background.

SUMMARY OF THE INVENTION

It is an object of the invention is to solve at least the above problems and/or disadvantages and to provide at least the advantages described hereinafter.

It is another object of the present invention to provide a system and method of controlling reverse power in a WLL that substantially obviates problems caused by disadvantages in the related art.

It is an another object of the present invention to provide a system and method of controlling reverse power in a WLL that reduces the load of a network system.

It is another objection of the present invention to provide a system and method of controlling reverse power in a WLL that avoids unnecessary power consumption by complementing and improving the related an reverse power control method for a WLL.

To achieve at least these objects in whole or in parts, there is provided a reverse power control method for a WLL including the steps of judging whether there is a packet data transmitted from a radio interface unit (RIU) or not, obtaining the average value of power if there is a transmitted data in the above step, judging whether there is further packet data transmitted from the RIU after the calculation of the average value of power, obtaining a power control value to be applied to the RIU, and wirelessly, transmitting the calculated power control value to the RIU.

In addition, as the result of judging whether there is a transmitted packet data, if there is no packet data transmitted from the RIU, the reverse power control method for a WLL further includes a step of setting an initial value PT of a correction value PO and judging again whether there is a transmitted packet data.

As the result of judging whether there is a transmitted packet, if there is a packet data transmitted from the RIU, the reverse power control method for a WLL further includes a step of send a feedback to the step of obtaining the average value of power.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
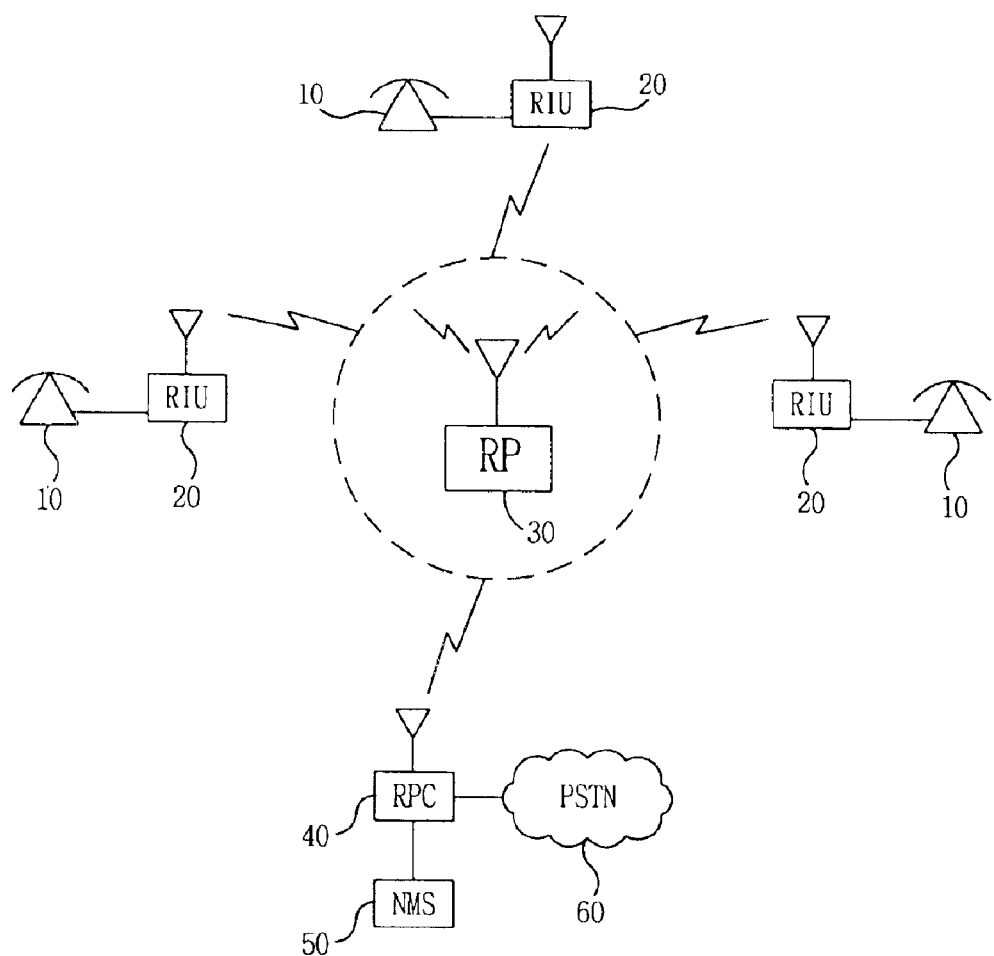
FIG. 1 is a block diagram of a related art WLL system configuration.
Figure 2:
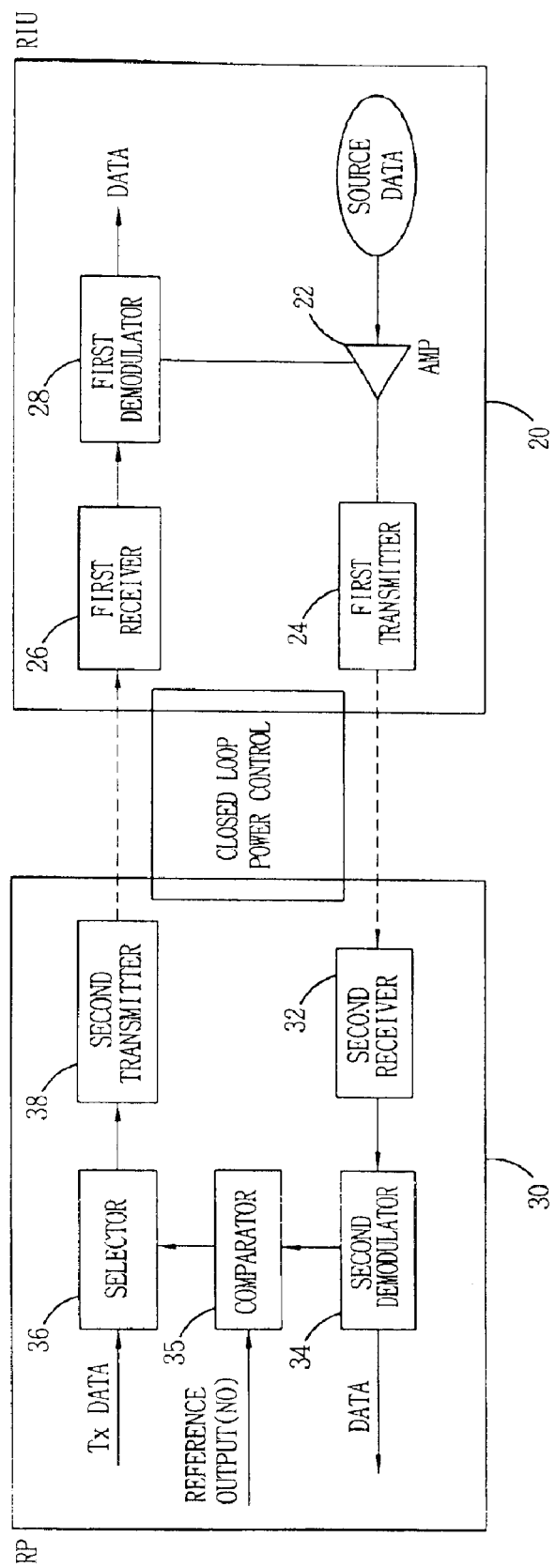
FIG. 2 is a block diagram of the interior of the RP and RIU of FIG. 1.
Figure 3:
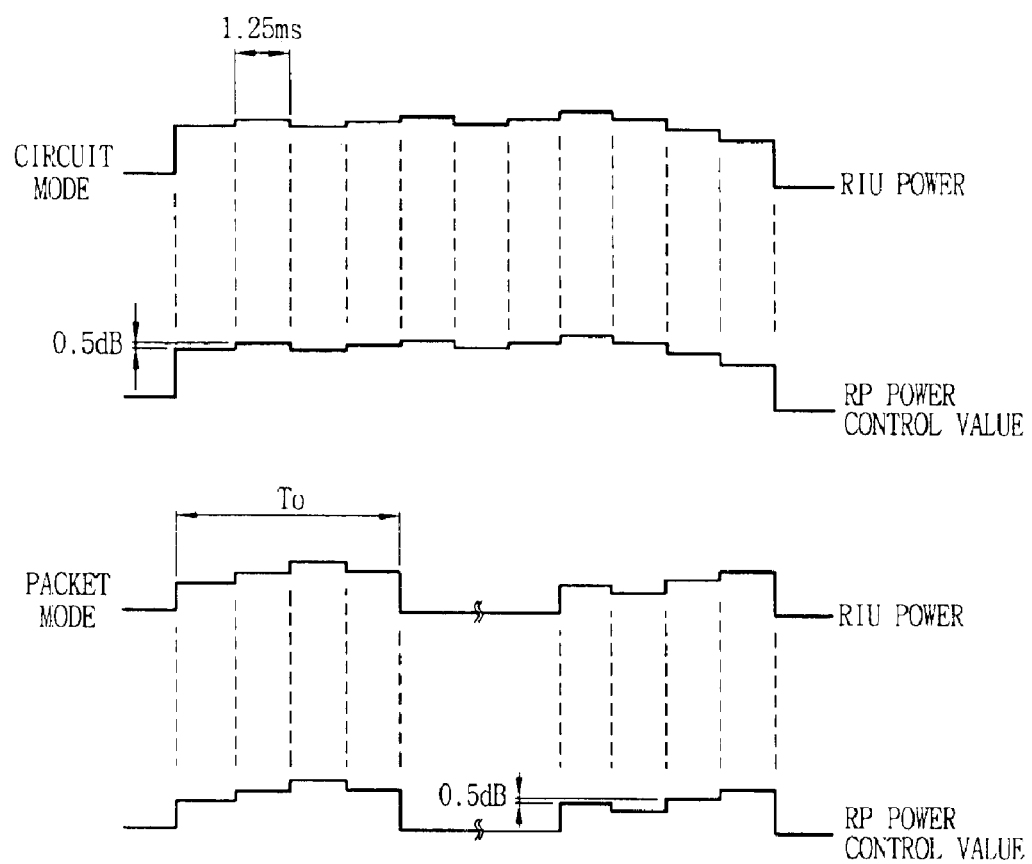
FIG. 3 is a drawing showing a power control status of a related art WLL.
Figure 4:
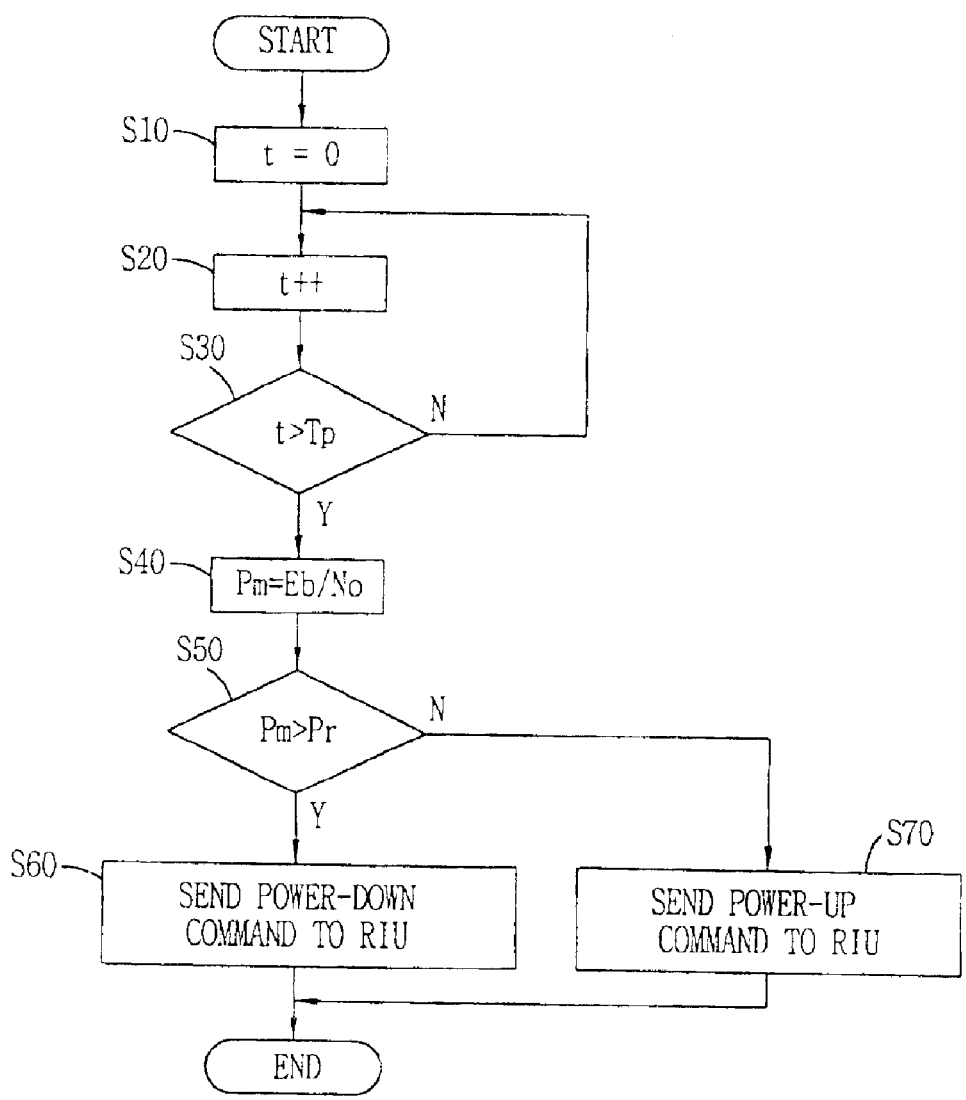
FIG. 4 is a sequential view of a related art reverse power control operation of the WLL.
Figure 5:
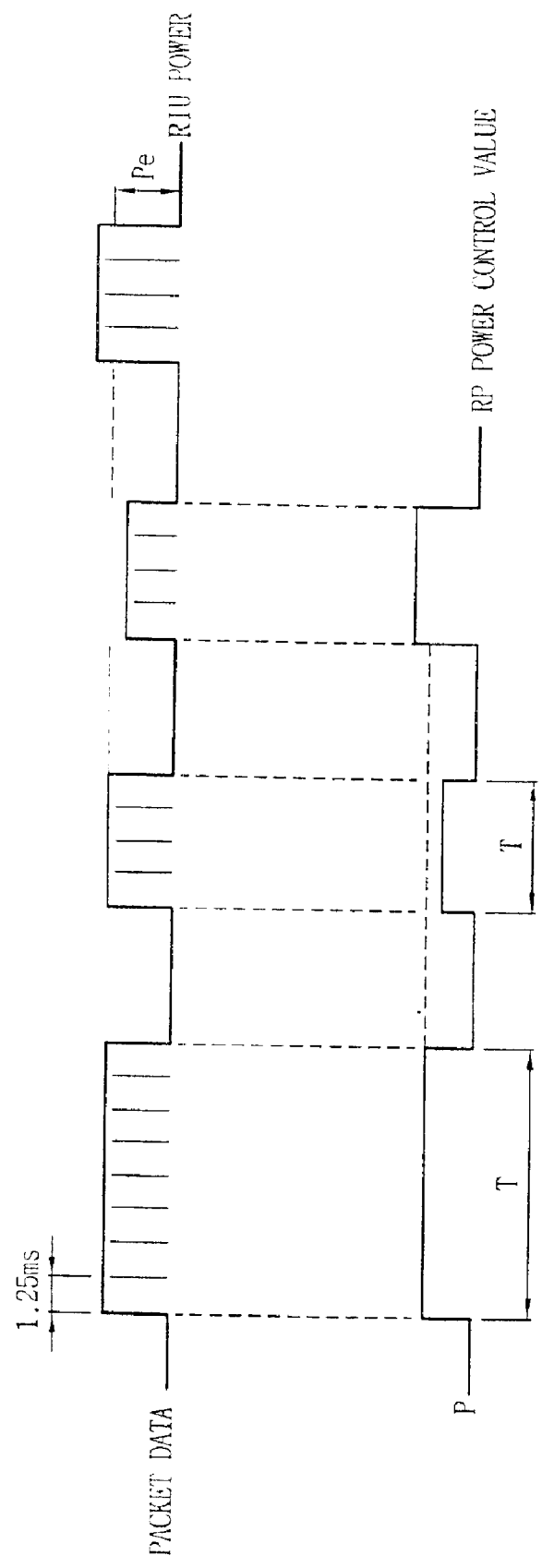
FIG. 5 is a drawing showing a power control status of a WLL according to a preferred embodiment of the present invention.
Figure 6:
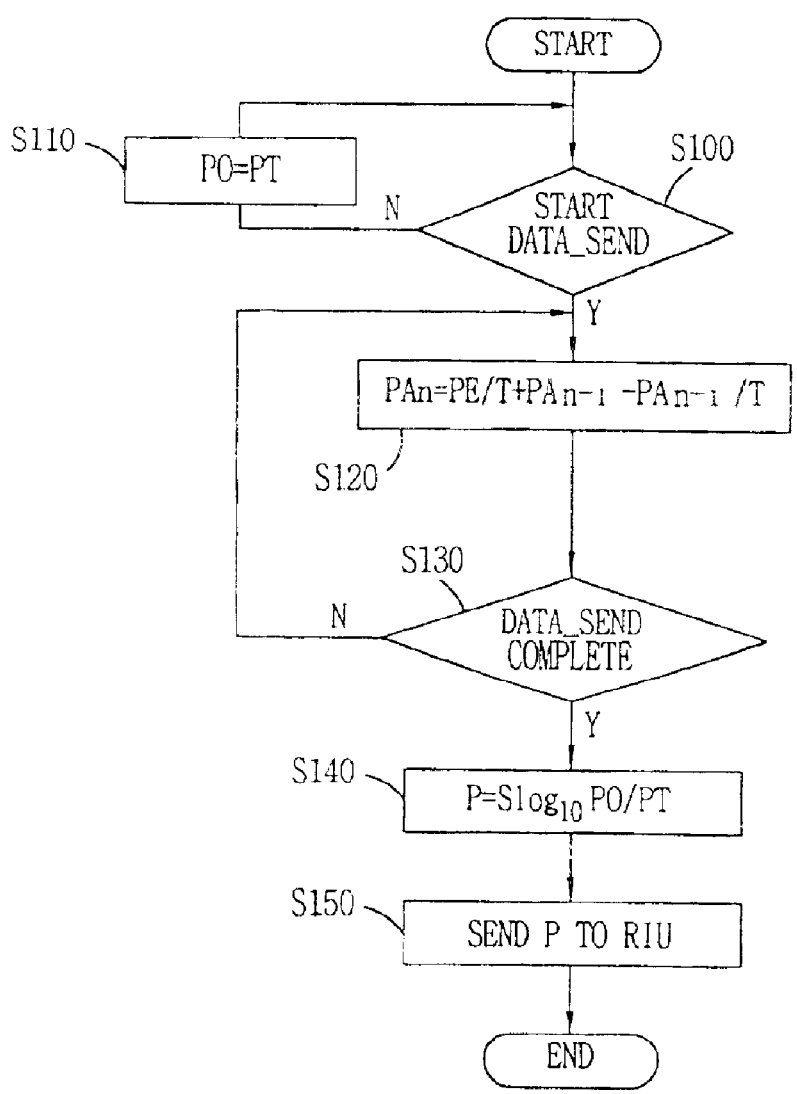
FIG. 6 is a drawing showing a sequence of the reverse power control operation of the WLL according to the preferred embodiment of the present invention.

FIG. 5 shows a power control status of a WLL, and FIG. 6 shows a sequence of the reverse power control operation of the WLL, according to the preferred embodiment of the present invention. Referring to FIGS. 5 and 6, the reverse power control method for a WLL will now be described.

To perform the reverse power control, the RP 30 must first determine in step S100 whether a packet of data has been transmitted from the RIU 20. The standard of judgment is a traffic channel power value. By comparing a traffic channel power value transmitted from the RIU 20 to a preset threshold value, it is can be determined whether packet data has been transmitted or not.

In step S100, if the detected traffic channel power value is determined to be lower than the threshold value, the RP 30 judges that no packet data has been transmitted. It accordingly sets a correction value PO to a predetermined initial value of PT, and repeats step S100 until the detected traffic channel power value becomes larger than the threshold value in step S100.

If the detected traffic channel power value is determined to be higher than the threshold value, the RP 30 judges that packet data has been transmitted. It thus calculates the average value of a power sent from the RIU in step S120. The equation for calculating the average power value is an equation using a moving average, which is shown below as Equation 2.

$$PA_n = PE/T + PO$$

$$PO = PA_{n-1} - PA_{n-1}/T \quad \text{[Equation 2]}$$

$PA_n$: average power value (n-th) PO: correction value
PE: output power value T: packet transmission interval The RP 30 having completed the calculation step S130 next checks whether there is further packet data transmitted from the RIU 20. This operation has the same logic as described above.

If the RP 30 determines that there is further packet data transmitted from the RIU in step S120, it sends the feedback of this operation to step S120 to calculate an average value. If, however, the RP 30 determines that there are no further packet data transmissions, it calculates the power control value P in step S140.

The power control value is preferably obtained by dividing the correction value PO by an initial value PT, taking $Log_{10}$ of the divided value, and then multiplying the resultant value by a prescribed scale value. See Equation 3 below. In the preferred embodiment, the scale value is a negative number predetermined between the RIU 20 and the RP 30. If the previous power (n−1-th) of the RIU 20 is higher than the current power, the power (n-th) to be sent is adjusted to a lower value. If, on the other hand, the previous power (n−1-th) value is lower than the current power, the power (n-th) to be sent is adjusted to a higher value.

$$P = S \, Log_{10} PO/PT \quad \text{[Equation 3]}$$

P: control value PO: correction value
PT: initial value S: scale value

The control value P obtained in step S140 is wirelessly transmitted from the RP 30 to the RIU 20. In the above description of the preferred embodiment, the RP 30 performs power control only when there is packet data transmitted from the RIU 20, and the step of sending the calculated control power to the RIU 20 is performed only once at the last section of a packet data interval. At this time, the temporal length of one packet data transmission is referred to as a transmission interval.

Hereinafter, the power control method of the preferred embodiment will be compared to the related art power control method.

In the related art power control method for a line mode WLL if a call is set between a transmitter and a receiver, the power of the transmitter is controlled in a predetermined time duration until the setting is released.

In the related art power control method for a packet mode WLL the power of the transmitter is measured in a predetermined time duration, and is controlled in predetermined units.

In contrast, in the power control method for a packet mode WLL according to the preferred embodiment, the power of the transmitter is controlled only for the transmission time of a packet data from the transmitter. A power control signal is transmitted just once.

As described above, in the preferred embodiment of the reverse power control method for a WLL has many advantages. For example, the number of times of power control value transmission is reduced to 1, and the related art method in which the power control of the RIU 20 is performed in units of 0.5 dB is complemented so that power is controlled more concretely and flexibly. Consequently, unnecessary power consumption due to power control in the WLL system is reduced to thus conserve system operation power, and the load of the system is reduced to thus improve the reliability of communication.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A reverse power control method for a wireless local loop, comprising:
    determining whether packet data is transmitted from a radio interface unit (RIU);
    calculating an average power value if data is transmitted;
    determining whether further packet data is transmitted from the RIU after calculating the average power value;
    calculating a power control value to be applied to the RIU; and
    wirelessly transmitting the calculated power control value to the RIU,
    wherein calculating the average power includes calculating an average value of a current transmission interval based on a calculated average power of a previous transmission interval.

2. The method of claim 1, further comprising sending feedback to the step of calculating the average value of power if it is determined that packet data is transmitted from the RIU.

3. The method of claim 1, wherein the power control value is transmitted only when the last data packet comes into the transmission interval of each packet data.

4. The method of claim 1, wherein the power control is transmitted only once during a data packet transmission interval.

5. A reverse power control method for a wireless local loop, comprising:
    determining whether packet data is transmitted from a radio interface unit (RIU);
    calculating an average power value if data is transmitted;
    determining whether further packet data is transmitted from the RIU after calculating the average power value;
    calculating a power control value to be applied to the RIU; and
    wirelessly transmitting the calculated power control value to the RIU; and
    setting an initial value PT to a correction value PO if it is determined that no packet data is transmitted from the RIU, and determining again whether packet data is transmitted.

6. A reverse power control method for a wireless local loop, comprising:
    determining whether packet data is transmitted from a radio interface unit (RIU);
    calculating an average power value if data is transmitted;
    determining whether further packet data is transmitted from the RIU after calculating the average power value;
    calculating a power control value to be applied to the RIU; and
    wirelessly transmitting the calculated power control value to the RIU,
    wherein the standard of determination in the determining steps is a traffic channel power value, and if the traffic channel power value is lower than a threshold value, a determination is made that no packet data has been transmitted, and if the traffic channel power value is higher than the threshold value, a determination is made that packet data has been transmitted.

7. The method of claim 6, wherein the power control is performed only when packet data is transmitted from the RIU.

8. A reverse power control method for a wireless local loop, comprising:
    determining whether packet data is transmitted from a radio interface unit (RIU);
    calculating an average power value if data is transmitted;
    determining whether further packet data is transmitted from the RIU after calculating the average power value;
    calculating a power control value to be applied to the RIU; and
    wirelessly transmitting the calculated power control value to the RIU,
    wherein the average power value $PA_n$ is calculated by dividing a power value PE received from the RIU by a transmission interval T, and adding a correction value PO to the resultant value.

9. A reverse power control method for a wireless local loop, comprising:
    determining whether packet data is transmitted from a radio interface unit (RIU);
    calculating an average power value if data is transmitted;
    determining whether further packet data is transmitted from the RIU after calculating the average power value;
    calculating a power control value to be applied to the RIU; and
    wirelessly transmitting the calculated power control value to the RIU,
    wherein the power control value is calculated by dividing a correction value PO by an initial value PT, taking $Log_{10}$ of the divided value, and multiplying the resultant value by a prescribed scale value.

10. The method of claim 9, wherein the scale value is a negative number predetermined between the RIU and a radio port (RP).

11. The method of claim 10, wherein the RP uses an average power value of a transmission interval to perform power control of the RIU.

12. The method of claim 9, wherein the correction value PO is calculated by subtracting from the average power of a previous transmission interval a quotient of an average power from the previous transmission interval divided by a packet transmission interval.

13. The method of claim 12, wherein a current average power is equal to a current output power value divided by the packet transmission interval, plus the correction value PO.

14. A reverse power control method for a wireless local loop, comprising:

determining whether packet data is transmitted from a radio interface unit (RIU) and setting a correction value PO to an initial value PT if the packet data is not transmitted from the RIU, and judging again whether packet data is transmitted;

calculating an average power value packet if data is transmitted;

determining whether further packet data is transmitted from the RIU after calculating the average power value, and if further data is transmitted from the RIU, sending feedback to the step of calculating the average power value;

calculating a power control value to be applied to the RIU, when no further packet data is transmitted from the RIU; and wirelessly transmitting the calculated power control value to the RIU.

15. The method of claim 14, wherein the power control value is transmitted only once during a data packet transmission interval.

16. The method of claim 14, wherein the average power value PAn is calculated by dividing a power value PE received from the RIU by a transmission interval T, and adding a correction value PO to the resultant value.

17. A wireless communication system, comprising:

a plurality of radio interface units (RIU) configured to transmit and receive data; and at least one radio port (RP), coupled to send and receive data to and from each of the plurality of RIUs, wherein the RP is configured to calculate an average transmission power of a transmitting one of the plurality of RIUs during a data transmission period, and wherein the RP calculates a power control value at the end of the data transmission period in accordance with the average transmission power, and wherein the RP controls the RIU transmitting power by transmitting the power control value, and wherein calculating the average transmission power includes calculating an average value of a current transmission interval based on a calculated average power of a previous transmission interval.

18. The system of claim 17, wherein the plurality of RIUs and the at least one RP comprise a wireless local loop.

19. A wireless communication system, comprising:

a plurality of radio interface units (RIU) configured to transmit and receive data; and at least one radio port (RP), coupled to send and receive data to and from each of the plurality of RIUs, wherein the RP is configured to calculate an average transmission power of a transmitting one of the plurality of RIUs during a data transmission period, and wherein the RP calculates a power control value at the end of the data transmission period in accordance with the average transmission power, wherein the RP controls the RIU transmitting power by transmitting the power control value, and wherein the average transmission power is calculated by dividing a power value PE received from one of the plurality of RIUs by a transmission interval T, and adding a correction value PO to the resultant value.

20. The system of claim 19, wherein the power control value is calculated by dividing a correction value PO by an initial value PT, taking Log 10 of the divided value, and multiplying the resultant value by a prescribed scale value, and wherein the power control value is transmitted only once during the transmission interval T.

21. A method of controlling power in a wireless communication system, comprising:

calculating an average transmission power during a data transmission period;

calculating a power control value at the end of the data transmission period based on the average transmission power; and controlling transmission power in the wireless system using the power control value, wherein the average transmission power is calculated by adding a correction value to a quotient of an output power divided by the data transmission period.

22. The method of claim 21, wherein the correction value is set to a prescribed initial value during a non-transmitting period, and is subsequently calculated by subtracting (a) a quotient of a previous average power value divided by the data transmission period from (b) the previous average power value.

23. The method of claim 22, wherein the power control value is calculated by scaling a logarithm of a quotient of the correction value divided by the initial value.

24. The method of claim 23, wherein the scaling factor is a negative value.

25. The method of claim 23, wherein the power control value is transmitted only at the end of the data transmission period.

26. The method of claim 23, wherein the logarithm is a base 10 logarithm.

* * * * *